United States Patent [19]

Fong

[11] Patent Number: 5,075,390

[45] Date of Patent: Dec. 24, 1991

[54] SYNTHESIS OF HYDROPHOBIC/ALKOXYLATED POLYMERS

[75] Inventor: Dodd W. Fong, Naperville, Ill.

[73] Assignee: Nalco Chemical Company, Naperville, Ill.

[21] Appl. No.: 548,838

[22] Filed: Jul. 6, 1990

[51] Int. Cl.$^5$ ................................ C08F 8/32
[52] U.S. Cl. ........................ 525/379; 525/374.4; 525/329.9; 525/380; 525/382
[58] Field of Search ............... 525/374, 380, 382

[56] References Cited

U.S. PATENT DOCUMENTS

| | | | |
|---|---|---|---|
| 3,474,003 | 11/1969 | McClendon | 260/80.73 |
| 3,503,946 | 3/1970 | Scanley et al. | 260/89.7 |
| 3,897,404 | 7/1975 | Korte et al. | 525/329.9 |
| 4,139,689 | 2/1979 | Hochreuter et al. | 525/329.9 |
| 4,192,784 | 3/1980 | Brown et al. | 260/8 |
| 4,297,226 | 10/1981 | Hunter | 252/8.55 |
| 4,326,969 | 4/1982 | Hunter | 252/8.55 |
| 4,731,419 | 3/1988 | Fong | 525/328.2 |
| 4,792,343 | 12/1988 | Hawe et al. | 44/51 |
| 4,870,137 | 9/1989 | Lopez et al. | 525/380 |
| 4,885,345 | 12/1989 | Fong | 525/329 A |
| 4,921,903 | 5/1990 | Fong | 524/555 |

FOREIGN PATENT DOCUMENTS 187491 5/1985 Japan .

*Primary Examiner*—Bernard Lipman
*Attorney, Agent, or Firm*—Joan I. Norek; Robert A. Miller; Donald G. Epple

[57] ABSTRACT

The preparation of polymers which contain pendant hydrophobic groups or a mixture of both pendant hydrophobic and alkoxylated groups is accomplished by reacting a preexisting polymer having pendant acid amide and/or carboxylic groups with a primary or secondary amine in a substantially homogenous reaction mixture, the amine reactant including the desired hydrophobic and alkoxylated radicals. A unique polymer, having both pendant hydrophobic and alkoxylated groups, is provided.

16 Claims, No Drawings

SYNTHESIS OF HYDROPHOBIC/ALKOXYLATED POLYMERS

TECHNICAL FIELD OF THE INVENTION

The present invention is in the technical field of polymer synthesis by post-polymerization derivatization to provide polymers having pendant amide moieties that are substituted at the amide nitrogen with hydrophobic radicals and with a mixture of hydrophobic radicals and alkoxylated radicals, and polymers having unique combinations of such groups.

BACKGROUND OF THE INVENTION

Polymers prepared by the polymerization of relatively simple, ethylenically-unsaturated monomers such as (meth)acrylic acid and its esters, (meth)acrylamide, maleic anhydride or maleic acid, crotonic acid and its esters, methyl vinyl ether, vinyl acetate, acrylonitrile, styrene and the like, are well known and are relatively easy to prepare by polymerization techniques well known in the art. The preparation of polymers that contain hydrophobic pendant groups by the polymerization of ethylenically-unsaturated monomers which contain such hydrophobic groups using conventional polymerization techniques is limited by the availability of such monomers and possible complications arising in the attempt to incorporate such monomers into the polymer during the polymerization. Complications during the polymerization may well occur if the hydrophobe-containing monomer does not have solubility characteristics that are compatible with the desired polymerization technique(s).

The difficulties generally encountered in the synthesis of polymers which contain pendant hydrophobic groups by conventional polymerization techniques for ethylenically-unsaturated monomers are generally multiplied if the desired goal is to prepare a polymer which also contains pendant alkoxylated groups. The monomer availability problems, and complications in incorporating such diverse monomers into a polymer, are severely increased.

Post-polymerization derivatization of polymers prepared by conventional polymerization techniques, using relatively simple and readily available monomers, whereby pendant hydrophobic groups, or a mixture of pendant hydrophobic groups and pendant alkoxylated groups, are introduced into the polymer avoids the difficulties regarding monomer availability and the complications encountered in incorporating such unusual monomers during a polymerization reaction. Such a post-polymerization process is highly desirable if it is economically efficient. Economic efficiency is dependent upon many variables, including the efficiency with which the process proceeds, the reasonableness of the reaction conditions required, the availability of both the basic polymer(s) to be derivatized and the derivatizing agent(s), the use of a minimum of reaction steps, the ease at which the end product polymer can be recovered from the reaction mixture, and the like.

Polymers having unique mixtures of pendant hydrophobic groups and pendant alkoxylated groups are highly desirable given the unique properties imparted to the polymer by the combinations of such diverse groups It is an object of the present invention to provide a process for preparing a polymer containing pendant hydrophobic groups and both pendant hydrophobic groups and pendant alkoxylated groups by post-polymerization derivatization using polymers prepared by conventional techniques using readily available monomers. It is an object of the present invention to provide such a process whereby such groups can be incorporated into a wide variety of pre-existing commercially available polymers. It is an object of the present invention to provide such a process that minimizes the reaction steps required and the time required for the derivatization. It is an object to provide such a process that proceeds under relatively mild reaction conditions and minimizes any deleterious effects on the polymer structure. It is an object of the present invention to provide such a process that generally can employ commercially available derivatizing agents. It is an object to provide such a process that employs generally a reasonably high concentration of reactants, and hence renders the method economically desirable as to the end product yield for the given time, equipment, energy and the like utilized. It is an object to provide such a process wherein the polymer end product is easily recovered from the reaction mixture.

It is an object of the present invention to provide a unique polymer having incorporated thereinto mixtures of hydrophobic and alkoxylated pendant groups.

These and other objects of the present invention are described in more detail below.

DISCLOSURE OF THE INVENTION

The present invention provides a method of preparing polymers having pendant hydrophobic groups or mixtures of both pendant hydrophobic groups and pendant alkoxylated groups by derivatization of pre-existing polymers in a substantially homogeneous reaction mixture. The derivatization process employs pre-existing polymers that contain pendant groups having the structure of Formula I:

$$-(C_nH_{2n})-\underset{\underset{O}{\|}}{C}-X \qquad \text{Formula I}$$

wherein n is zero or an integer from 1 to about 10, and X is $-NH_2$, $-OH$, or $-O^-$, nd salts thereof, and mixtures or combinations of such pendant groups.

By "salts" is meant herein alkali metal salts, alkaline earth metal salts, ammonium salts, amine salts, alkanol amine salts, and the like.

The derivatization process employs as the source of hydrophobic radicals, or hydrophobic and alkoxylated radicals, primary and secondary amines containing the desired radical(s).

The reaction mixture is comprised of the reactants, i.e., the polymer(s) and the amine(s), and a reaction medium in which the reactants are soluble or substantially homogenously dispersible. In a preferred embodiment an aqueous reaction medium is employed.

When the polymers employed are derived from ethylenically unsaturated monomer, the pendant groups subject to derivatization are contained in a polymer "unit" or "mer unit" (a segment of the polymer having two adjacent backbone carbons) having the structure of Formula II:

$$\begin{array}{c} R_1\ R_2 \\ | \ \ | \\ {+}C{-}C{+} \\ | \ \ | \\ R_3\ Y \end{array} \qquad \text{Formula II}$$

wherein $R_1$, $R_2$ and $R_3$ are independently hydrogen or substituent other than hydrogen and wherein Y is the pendant group(s) the structure of which is defined above by Formula I.

By "substituent" is meant herein a single or multivalent radical other than hydrogen covalently bonded to a carbon or nitrogen of the referenced molecule.

substituents other than hydrogen, typically they are $C_{1-4}$ alkyl or carboxylic substituents.

The derivatization process is a (trans)amidation reaction whereby the hydrophobic radicals or hydrophobic and alkoxylated radicals of the end product polymer are substituents to the nitrogen of an acid amide group, as discussed in more detail below.

The present invention also provides unique polymers that contain both hydrophobic and alkoxylated pendant groups which are substituents to the nitrogen of an acid amide group, as discussed in more detail below.

PREFERRED EMBODIMENTS OF THE INVENTION

The polymers employed in the derivatization process contain pendant groups having the structure of Formula I above and include pendant groups having carboxyl, carboxylate, and acid amide moieties. Such moieties are the reactive groups that enter the (trans)amidation reaction with the amine derivatizing agents, There is no theoretical minimum of mer units containing such groups required of the polymer employed and the derivatization theoretically can be accomplished with as little as one such mer unit per polymer molecule. Nonetheless it is believed that to achieve a favorable reaction without employing any significant excess of derivatizing agent, and to provide an end product polymer having a reasonable degree of properties derived by virtue of the derivatization, the starting material polymer should have 10 mole percent or more of mer units containing the pendant groups having the structure of Formula I above.

Ethylenically-unsaturated monomers that provide to a polymer pendant groups having the structure of Formula I include (meth)acrylamide, (meth)acrylic acid and salts thereof, crotonic acid, maleic acid, maleic anhydride, and the like and other monomers, for instance acrylonitrile, (meth)acrylic acid esters, and the like, that may be converted into mer units having the desired pendant groups after incorporation into a polymer, for instance by hydrolysis. The monomers enumerated herein are of course not the only monomers that provide the desired polymer pendant groups but instead are representative of monomers that are both readily commercially available and are polymerizable by very simple and well known polymerization techniques, and hence the employment of polymers prepared from such monomers is a preferred embodiment of the invention.

Polymers that may be employed in the derivatization process may contain any amount of mer units other than those providing pendant groups of Formula I above, provided that such other mer units do not comprise the entirety of the polymer. As mentioned above, however, it is believed that to achieve a favorable reaction without employing any significant excess of derivatizing agent, and to provide an end product polymer having a reasonable degree of properties derived by virtue of the derivatization, the amount of mer units not providing pendant groups of the Formula I above should not exceed about 90 mole percent.

Generally any monomer that is polymerizable with the monomers providing pendant groups of the Formula I above may be incorporated into the polymer, although considerations such as ease of polymerization of the given monomer mixture, and the propensity of the comonomers to engage in side reactions or interfere with the derivatization reaction, may be factors in the selection of comonomers. For instance, under typical free radical initiated polymerization conditions, vinyl acetate is generally considered a good comonomer with maleic anhydride but not with acrylic acid, and hence its desirability as a comonomer is dependent upon the type of monomer that will be providing the necessary pendant groups. Other good comonomers with maleic anhydride are methyl vinyl ether, styrene or the like. Good comonomers with acrylic acid and acrylamide include the alkyl esters of acrylic acid, acrylonitrile and the like. Other possible considerations concerning the selection of suitable comonomers are the properties of the starting material polymer and the end material polymer. For instance, a hydrophilic comonomer may be preferred when it is desired to increase the water solubility of the starting material polymer and/or the end material polymer, or a hydrophobic comonomer may be selected to decrease water solubility when desired. An amount of butyl acrylate may be used as a comonomer to provide a degree of tack to the end product polymer. One comonomer may be more advantageous than another if the monomer itself is less toxic and the toxicity of residual monomer in the end product polymer is a consideration for the intended use of the polymer. The starting material polymer may be a random polymer, or other than a random polymer.

The derivatizing agents are primary and/or secondary amines having a hydrophobe radical, or mixtures of such amines with primary and/or secondary amines having alkoxylated radicals. For instance, the methyl radical of methyl amine is a hydrophobic radical, particularly considering the diminished hydrophilicity when a pendant acid amide group ($-CONH_2$) is derivatized to an N-substituted methyl amide group ($CONHCH_3$). Hydrocarbon radicals having three or more carbon atoms are significantly hydrophobic-for-purpose of the present invention, and hydrophobic radical having 12 or more carbon atoms are for some purposes of the present invention preferred. The hydrophobic radical need not be saturated, and for some purposes of the present invention a degree of carbon-to-carbon unsaturation is preferred for long-chain hydrophobic radicals. The hydrophobic radical may contain other substituents provided that such substituents do not destroy the hydrophobic nature of the radical. While primary amines are preferred, the use of secondary amines is not hereby excluded.

The employment of a mixture of both amines having hydrophobic radicals and amine having alkoxylated radicals provides unique end product polymers having significant diverse pendant groups. Alkoxylated radicals generally contain ethoxy ($-CH_2CH_2-$) groups or propoxy ($-CHCH_3CH_2O-$) groups, generally derived from ethylene oxide and propylene oxide, or mixtures of both types of alkoxy groups. The alkoxylated amine derivatizing agent should contain an amino, group, preferably a primary amino group, and at least one alkoxy group, and may contain other groups, for instance hydrocarbon groups. A very useful group of commercially available alkoxylated primary amines are sold by the Texaco Chemical Company under the tradename of "Jeffamine". (Jeffamine is a trademark of the Texaco Chemical Company, a Division of Texaco Inc.) For instance, Jeffamine M-600 has the following structure:

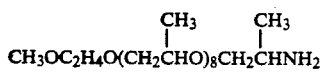

As seen from the structural formula above, Jeffamine M-600 contains both ethoxy and propoxy groups and is reported to have more than 1.71 meq/g of primary amine. Another Jeffamine product having a mixture of ethoxy and propoxy groups is Jeffamine M-1000 which has the following structure:

As seen from the use of fractional subscripts in the structural formula above, Jeffamine M-1000 is a mixture of linear polyether amines varying somewhat in their total ethoxy and proppxy groups. Jeffamine M-1000 is reported to have a total amine content of 0.85 meq/g and a primary amine content of 0.83 meq/g. Jeffamine M-300 and Jeffamine M-360 both contain a reasonably significant hydrocarbon group. Jeffamine M-300 has the structure of:

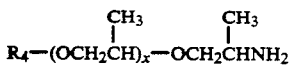

wherein $R_4$ is a mixture of linear C to $C_{12}$ alkyl groups and x has an average value of 1. Jeffamine M-360 has the structure of:

and has a total amine content of greater than 2.47 meq/g and a primary amine content of greater than 2.39 meq/g.

Another useful groups of commercially available alkoxylated primary amines are sold by the Texaco Chemical Company under the tradename of "Surfonamine MNPA" (Surfonamine is a trademark of the Texaco Chemical Company), and this series of alkoxylated amines has the general structural formula of:

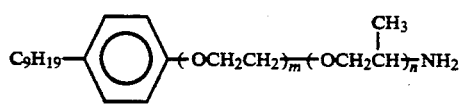

wherein m, the number of ethoxy radicals per molecule, varies from about 1 to about 12, and n, the number of propoxy radicals per molecule, varies from about 1 to about 4, for the various amines of the series, i.e., Surfonamine MNPA-380, 510, 750, and 860. These nonylphenol alkoxylated primary amines contain both a hydrocarbon chain and an aromatic radical, in addition to the alkoxy and amine radicals.

By alkoxylated amine is meant herein generally an amine, either primary or secondary, having at least on alkoxy radical, either ethpxy or propoxy, within its chemical structure. In preferred embodiment, the alkoxylated amine is an amine wherein the alkoxy radical(s) comprise at least one percent of the amine's formula weight. In more preferred embodiment, the alkoxylated amine is an amine wherein the alkoxy radical(s) comprise at least five percent of the amine's formula weight, and in even more preferred embodiment, at least ten percent of the amine's formula weight.

A useful group of hydrophobic radical containing amines are the aliphatic amines commercial available under the tradename of "Armeen" from Armak Chemicals ("Armeen" is a registered trademark of Akzo Chemie America for the aliphatic amines produced by Armak Chemicals). Among the available Armeen primary amines are soyaamine ($C_{18}H_{35}NH_2$) sold under the tradenames of Armeen S and Armeen SD. Armeen SD has a water solubility (in percent of solution weight) of about 10.13 at 50° C. and 4.01 at 80° C. It has a primary amine content of 98% and a secondary amine content of 2% (ASA). At 25° C. it is a paste, and at 55° C. it has a viscosity of about 38.5 SSU. Although it is considered an octadecenyl amine as noted by the formula above, the reported carbon chain distribution is 70% octadecenyl, 14% octadecyl, 5% octadecadienyl, 4% for each of hexadecyland octadecenyl, and more minor amounts of other carbon chains. Armeen S is a less expensive, undistilled form of such soyaamine. Among other Armeen primary amines are Armeen HTD, a hydrogenated tallow amine ($C_{18}H_{37}NH_2$) having a water solubility of 4.39 at 80° C. (a nonfluid mixture in water at 60° C.), Armeen 16D, a hexadecylamine ($C_{16}H_{33}NH_2$) which has a water solubility of 12.99 at 60° C. and 5.47 at 80° C., and Armeen 12D, a dodecylamine ($C_{12}H_{25}NH_2$), which is a liquid at 25° C., and has a water solubility of 24.35 at 50° C. and 12.50 at 80° C. Among Armeen secondary amines are Armeen 2C, a dicocoamine ($C_{12}H_{25})_2NH$, a solid at 25° C., and Armeen 2HT, a di(hydrogenated-tallow)amine, ($C_{18}H_{37})_2NH_2$, which is also solid at 25° C.

In preferred embodiment the (trans)amidation process is conducted in an aqueous medium. The use of an aqueous medium is generally less expensive than a nonaqueous medium. The end product polymer is easier to isolate from an aqueous medium. An aqueous medium moreover minimizes the toxicity of the reaction mixture, and the toxicity of the end product polymer if not completely isolated from the reaction medium. In addition, for some use applications, if an aqueous reaction medium is employed, the end product polymer isolation step may not be required. While all of such advantages ensue from the use of an aqueous reaction medium, the employment of an aqueous reaction medium heretofore would generally be considered contrary to the objectives of obtaining a reasonable degree of derivatization and an economically efficient process. In an aqueous reaction medium, interference with the derivatization would be expected due to the propensity of such system to lead to an excessive degree of hydrolysis of the reactants. In addition, it is surprising, given the water solubilities of the present reactants, that an efficient derivatization reaction proceeds in an aqueous medium at relatively high concentrations of reactants, and concomitantly in a system having relatively low fluidity.

The present invention does not, in its broadest definition, exclude the use of nonaqueous reaction mediums, for instance dimethyl sulfoxide ("DMS") or various other organic liquids.

The reactants should be soluble or substantially homogeneously dispersible in the reaction medium employed, given the concentrations of reactants used. Hydrophobe-containing amine reactants having some degree of carbon-to-carbon unsaturation within the hydrophobic moiety are generally more fluid than the equivalent fully saturated amines and such fluidity facilitates dispersing such reactants in the reaction medium, particularly when the medium is water. When polymer reactants of very limited water solubility are employed in an aqueous reaction medium, the concentration of the reactants in such process can of course be lowered if needed for to disperse the reactants. The water solubility or water dispersibility characteristics of the starting material polymer are dependent upon the balance between its hydrophobic and hydrophilic pendant groups, and its molecular weight, and thus while in some instances one can select the starting material polymer so as to provide the desired degree of water solubility, in other instances the preference for a given polymer is an overriding factor.

As long as a reasonable degree of substantially homogeneous dispersion of the reactants in the reaction medium is achieved, the starting reaction mixture need not even be fluid at room temperature.

The end product polymer, even when an aqueous reaction medium is employed, may possibly not be water soluble or water dispersible.

The (trans)amidation reaction is conducted at elevated temperatures and under pressures that exceed atmospheric pressure. The reaction generally is accomplished in a closed vessel at a temperature of from about 120° C. to about 200° C.

The starting material polymer may contain participating pendant groups that are wholly acid amide groups, for instance the pendant groups of (meth)acrylamide mer units, or that are wholly carboxylic groups, for instance the pendant groups of (meth)acrylic acid or maleic anhydride mer units. If the former situation existed, the process would be considered a transamidation reaction whereby acid amide groups are derivatized by amine reactants to N-substituted acid amide groups. If the latter situation existed, the process would be considered an amidation reaction whereby carboxylic groups would be derivatized by amine reactants to N-substituted acid amide groups. Hence the process is deemed a (trans)amidation reaction, and it has been found that the derivatization proceeds extremely efficiently when the starting material polymer contains a mixture of both carboxylic groups and acid amide groups.

The derivatization reaction generally does not proceed to the exhaustion of all of the derivating amine employed, and hence it is desirable to use a greater charge of amine reactant than stoichiometrically required for the desired degree of derivatization.

A one to one mole ratio of participating polymer pendant groups to derivatizing amine possibly may be used, and in fact less participating pendant groups and amine reactant, on a mole basis, may be reasonably used. Generally, however, it is desirable to have potential participating pendant groups in excess of the amount required for the extent of derivatization desired, particularly when such potentially participating pendant groups themselves impart desired characteristics to the end product polymer.

The derivatization reaction should be permitted to proceed for at least a one-half hour duration, and preferably for a time period of from about three to about eight hours.

In Examples 1 through 8 that follow, the derivatization process was conducted using a concentration of starting material polymer of from about 20 to about 32 weight percent based on the entire reaction mixture (polymer, derivatizing agent and water medium). In highly preferred embodiment the concentration of starting material polymer on such basis is at least 20 weight percent, although a reasonably efficient process ensues when the concentration of the starting material polymer is as low as 10 weight percent, same basis. As discussed above, at times it may be necessary to decrease the concentration of starting material polymer so as to use a desired polymer, and then the polymer concentration may fall to as low as 5 weight percent or less.

The concentration of the end material polymer in the reaction mixture is of course dependent on the amount of derivatizing agent employed and the degree of reaction, in addition to the initial polymer concentration. In Example 3 that follows, the starting material polymer's concentration was about 31 weight percent, and the end material polymer's concentration was about 43 weight percent.

As discussed above, the starting material polymer must contain pendant groups having the structure of Formula I above. Such pendant groups contain either a carboxylic radical (wherein X of Formula I is —OH and/or —O—) or an acid amide radical (wherein X of Formula I is -NH2). In preferred embodiment the mole ratio of carboxylic radical containing pendant groups to acid amide containing pendant groups in the starting material polymer ranges from about 1:0 to about 1:9, and in more preferred embodiment ranges from about 1:0 to about 1:3.

The unique polymers of the present invention contain both hydrophobic and alkoxylated groups which are substituents to the nitrogen of pendant acid amide groups. The presence of these diverse groups within the same polymer provides unique characteristics for various end use applications. For instance, when used in water systems, both types of pendant groups may have a propensity to attach to substrates. The hydrophobic moieties will tend to attach to substrates by virtue of their hydrophobic nature, while the alkoxylated moieties may tend to attach to substrate surfaces due to hydrogen bonding and like mechanisms. The presence of both types of side chains provides unique thickening characteristics. It is believed that to provide unique characteristics in applications where substrate attachment is desired, for instance soil release or shale stabilization applications, or in applications where unique thickening properties are desired, the polymer may contain as little as 0.1 mole percent of each type of group, based on total moles of mer units in the polymer. In preferred embodiment, the polymer contains at least 1 mole percent of each type of group (hydrophobic moiety and alkoxylated moiety), based on total moles of mer units in the polymer. In more preferred embodiment, the polymer contains at least 2.5 mole percent of each type of group, same basis.

When an aqueous reaction medium is employed, a high efficiency process requires the molecular weight of the starting material polymer to be limited to about no more than 200,000, and in some instances, for instance if a homopolymer of acrylamide is used, to no more than 100,000 (weight average molecular weight). In preferred embodiment the starting material polymer is of rather low molecular weight, for instance no more than 50,000, and more preferably no more than about 25,000, and the preference for such low molecular weight starting material polymers is particularly germaine to the unique polymers having both hydrophobic and alkoxylated groups from which unique end use characteristics flow.

Preferably the molecular weight of the starting material polymer is at least about 2,000 (weight average molecular weight).

In general, regardless of whether the derivatizing agent is a hydrophobe-containing amine or a mixture of hydrophobe-containing amine and alkoxylated amine, the degree of derivatization desired is to incorporate at least 0.1 mole percent of derivatized groups into the polymer, based on total moles of mer units in the polymer, and more preferably to incorporate at least 1 mole percent of the derivatized groups into the polymer, same basis.

In preferred embodiment, the mole ratio of reactants, i.e., pendant polymer groups having the structure of Formula I above (participating pendant groups) to the amine-containing derivatizing agent(s) is from about 50:1 to about 1:2, and in more preferred embodiment is from about 50:1 to about 1:1.

EXAMPLE 1

An acrylamide homopolymer having a weight average molecular weight of about 7,500 was derivatized by transamidation reaction with soya-amine as follows. To 195 grams of a 33 weight percent aqueous solution of the polyacrylamide was added 25.11 grams of Armeen S, which is described above. This amount of Armeen S was a 10 mole percent charge based on the total number of mer units in the polymer charge. This admixture was placed into a 300 ml. Parr reactor. The reactor was purged with nitrogen, then sealed, heated internally to 150° C., and held at that temperature for a 5 hour reaction period. The reaction mixture recovered from the cooled reactor was a white milky liquid. Based on L.C. analysis for residual amine, the soya-amine was determined to have reacted to the extent of 90 weight percent of its initial charge.

EXAMPLE 2

Example 1 was repeated except the amount of the polyacrylamide solution was decreased to 175 grams and the mole percent charge of the soya-amine was increased to 20 mole percent (45.06 grams of Armeen S). The reaction mixture recovered was again a white milky liquid and, based on L.C. analysis for residual amine, the soya-amine was determined to have reacted to the extent of 68 weight percent of its initial charge.

EXAMPLE 3

An acrylic acid/acrylamide copolymer having a weight average molecular weight of about 16,000 was derivatized by reaction with soya-amine as follows. To 185 grams of a 35 weight percent aqueous solution of the copolymer was added 25.09 grams of Armeen S. This admixture was placed into a 300 ml. Parr reactor. The reactor was purged with nitrogen, then sealed, heated internally to 150° C., and held at that temperature for a 5 hour reaction period. The reaction mixture recovered from the cooled reactor was waxy solid. Based on L.C. analysis for residual amine, the soya-amine was determined to have reacted to the extent of 100 weight percent of its initial charge.

EXAMPLE 4

Example 3 was repeated except the amount of the copolymer solution was decreased to 170 grams and the charge of the soya-amine was increased to 46.10 grams. The reaction mixture recovered was again a waxy solid and, based on L.C. analysis for residual amine, the soya-amine was determined to have reacted to the extent of 97 weight percent of its initial charge.

EXAMPLE 5

An acrylic acid/acrylamide copolymer having a weight average molecular weight of about 16,000 was derivatized by reaction with both soya-amine and an alkoxylated amine (primary amine) in a single reaction as follows. To 165 grams of a 35 weight percent aqueous solution of the copolymer was added 11.9 grams of the soya-amine (Armeen S) and 40.38 grams of the alkoxylated amine (Jeffamine M-1000 which is described above). This admixture was placed into a 300 ml. Parr reactor. The reactor was purged with nitrogen, then sealed, heated internally to 150° C., and held at that temperature for a 5 hour reaction period. The reaction mixture recovered from the cooled reactor had a paste-like consistency. Based on L.C. analysis for residual amine, the soya-amine was determined to have reacted to the extent of 95 weight percent of its initial charge, and the alkoxylated amine was determined to have reacted to the extent of 83 weight percent of its initial charge.

Example 5 was repeated except the amount of the copolymer solution was decreased to 135 grams, the charge of the soya-amine was increased to 18.31 grams, and the charge of the alkoxylated amine was increased to 66.08 grams. The reaction mixture recovered was again of paste-like consistency. Based on L.C. analysis for residual amine, the soya-amine was determined to have reacted to the extent of 86 weight percent of its initial charge and the alkoxylated amine was determined to have reacted to the extent of 58 weight percent of its initial charge.

EXAMPLE 7

An acrylamide homopolymer having a weight average molecular weight of about 7,500 was derivatized as follows. To 170 grams of a 33 weight percent aqueous solution of the polyacrylamide was added 39.51 grams of Jeffamine M-1000 and 10.94 grams of Armeen S, both of which are described above. These amounts were a 5 mole percent charge of both the Jeffamine M-1000 and Armeen S based on the total number of mer units in the polymer charge. This admixture was placed into a 300 ml. Parr reactor. The reactor was purged with nitrogen, then sealed, heated internally to 150° C., and held at that temperature for a 5 hour reaction period. The reaction mixture recovered from the cooled reactor was a brown liquid. Based on L.C. analysis for residual amine, the soya-amine (Armeen S) was determined to have reacted to the extent of 38 weight percent of its initial charge, and the alkoxylated amine was determined to have reacted to zero weight percent of its initial charge.

EXAMPLE 8

Example 7 was repeated except the amount of the polyacrylamide solution was decreased to 135 grams, and the mole percent charges of both the soya-amine and alkoxylated amine were increased to 10 mole percent (62.75 grams of Jeffamine M-1000 and 17.38 grams of Armeen S). The reaction mixture recovered again was a brown liquid, and based on L.C. analysis for residual amine, the soya-amine was determined to have reacted to the extent of 34 weight percent of its initial charge and the alkoxylated amine was determined to have reacted to the extent of zero weight percent of its initial charge.

EXAMPLE 9

The product polymers of Examples 1 through 8 were analyzed for mole percent of carboxylate mer units by titration at pH of 10. The results of such carboxylate determinations are set forth below in Table I.

TABLE I

| Example No. of Polymer Preparation | Mole Percent of Carboxylate-Containing Mer Units |
|---|---|
| 1 | 42 |
| 2 | 32 |
| 3 | 50 |
| 4 | 47 |
| 5 | 53 |
| 6 | 42 |
| 7 | 41 |
| 8 | 34 |

INDUSTRIAL APPLICABILITY OF THE INVENTION

The present invention is applicable to the industries requiring agents for thickening, soil release and the like, wherein the polymers having pendant hydrophobic groups or pendant hydrophobic and alkoxylated groups are useful.

I claim:

1. A process for preparing a polymer having bonded to the polymer backbone pendant groups having the structural formula of

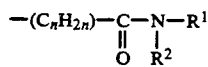

wherein n is zero or an integer of from 1 to about 10, $R^1$ is a hydrophobic radical or a mixture of hydrophobic and alkoxylated radicals, and $R^2$ is hydrogen or a substituent other than hydrogen, which comprises:
at least substantially homogeneously dispersing a preexisting polymer and at least one amine in a reaction medium to form a substantially homogeneous reaction mixture,
said reaction mixture containing at least about 5 weight percent of said preexisting polymer,
said preexisting polymer having participating pendant groups of the structural formula of

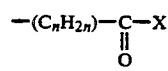

wherein n is as defined above and X is $-NH_2$, $-OH$, $-O^-$, and salts and mixtures thereof,
said amine being comprised of primary and/or secondary amines having hydrophobic radical substituents or mixtures of hydrophobic and alkoxylated radical substituents,
and then reacting said preexisting polymer with said amine in said reaction mixture within a closed vessel at an elevated temperature of from about 120° to about 150° C. for a time period sufficient to (trans-)amidate at least a portion of said participating pendant groups of said preexisting polymer with said amine.

2. The process of claim 1 wherein said reaction mixture consists essentially of water, said preexisting polymer and said amine.

3. The process of claim 1 wherein said preexisting polymer contains at least ten mole percent of mer units than contain said participating pendant groups.

4. The process of claim 1 wherein said hydrophobic radical contains at least three carbon atoms.

5. The process of claim 4 wherein said hydrophobic radical contains at least 12 carbon atoms.

6. The process of claim 1 wherein said amine is substantially primary amine.

7. The process of claim 1 wherein said amine having alkoxylated substituents is an amine wherein the alkoxy radicals comprise at least five percent of the amine's formula weight.

8. The process of claim 7 wherein the alkoxy radicals comprise at least ten percent of the amine's formula weight.

9. The process of claim 1 wherein the concentration of said preexisting polymer in said reaction mixture is at least 10 weight percent.

10. The process of claim 9 wherein the concentration of said preexisting polymer is said reaction mixture is at least 20 weight percent.

11. The process of claim 1 wherein the mole ratio of participating pendant groups having a formula wherein X is $-OH$ and/or $-O^-$ to participating pendant groups having a formula wherein X is $-NH_2$ is from about 1:0 to about 1:9.

12. The process of claim 11 wherein said mole ratio is from about 1:0 to about 1:3.

13. The process of claim 1 wherein said elevated temperature and said time period are sufficient to incorporate at least 0.1 mole percent of said hydrophobic radicals or mixture of hydrophobic and alkoxylated radicals, based on total mer units, into said preexisting polymer.

14. The process of claim 1 wherein the mole ratio of said participating pendant groups to said amine in said reaction mixture is from about 50:1 to about 1:2.

15. The process of claim 1 wherein said preexisting polymer has a weight average molecular weight of up to 50,000.

16. The process of claim 1 wherein said preexisting polymer is a polymer containing acrylic acid and acrylamide mer units.

* * * * *

UNITED STATES PATENT AND TRADEMARK OFFICE
CERTIFICATE OF CORRECTION

PATENT NO. : 5,075,390  
DATED : December 24, 1991  
INVENTOR(S) : Dodd W. Fong

It is certified that error appears in the above-identified patent and that said Letters Patent is hereby corrected as shown below:

In Column 2, line 43, delete "nd" and substitute therefor -- and --.

In Column 3, line 8, before "substituents", insert -- "When $R_1$, $R_2$ and/or $R_3$ of Formula II above are --.

In Column 4, line 43, delete "hydrophobic-for-purpose" and substitute therefor -- hydrophobic for purposes --.

In Column 4, line 59, delete " $(-CH_2CH_2)-)$ ", and substitute therefor -- $(-CH_2CH_2O-)$ --.

UNITED STATES PATENT AND TRADEMARK OFFICE
CERTIFICATE OF CORRECTION

PATENT NO. : 5,075,390

DATED : December 24, 1991

INVENTOR(S) : Dodd W. Fong

It is certified that error appears in the above-identified patent and that said Letters Patent is hereby corrected as shown below:

In Column 5, line 23, delete "proppxy", and substitute therefor -- propoxy --.

In Column 5, line 34, delete " C ", and substitute therefor -- $C_{10}$ --.

In Column 5, line 67, delete "ethpxy", and substitute therefor -- ethoxy --.

In Column 7, line 53, delete "derivating", and substitute therefor -- derivatizing --.

In Column 10, between lines 30 and 31, insert as a heading -- EXAMPLE 6 --.

Signed and Sealed this

Thirtieth Day of March, 1993

*Attest:*

STEPHEN G. KUNIN

*Attesting Officer*     *Acting Commissioner of Patents and Trademarks*